United States Patent [19]
Wadsworth

[11] Patent Number: 5,271,299
[45] Date of Patent: Dec. 21, 1993

[54] OIL FILTER WRENCH WITH OIL CATCHING BOOT

[76] Inventor: Jake Wadsworth, Rt. No. 1, Box 168, St. Ignatius, Mont. 59865

[21] Appl. No.: 33,361

[22] Filed: Mar. 18, 1993

[51] Int. Cl.⁵ .......................... B25B 13/06; B25F 1/00
[52] U.S. Cl. .................................. 81/121.1; 7/100
[58] Field of Search ............... 81/3.08, 3.09, 121.1, 81/120, 180.1; 7/100, 138

[56] References Cited

U.S. PATENT DOCUMENTS

| | | | |
|---|---|---|---|
| 2,746,330 | 5/1956 | Pfetzing | 81/53 |
| 3,385,141 | 5/1968 | Norman | 81/90 |
| 4,177,529 | 12/1979 | Sikula, Jr. | 7/100 |
| 4,230,002 | 10/1980 | Skidmore | 81/121 R |
| 4,266,452 | 5/1981 | Crist | 81/121 R |
| 4,697,480 | 10/1987 | Robideau | 81/3.09 |
| 4,714,138 | 12/1987 | Zaccone | 184/1.5 |
| 4,867,017 | 9/1989 | Holman | 81/121.1 |
| 4,951,721 | 8/1990 | Moore et al. | 7/100 X |

FOREIGN PATENT DOCUMENTS 894656 10/1953 Fed. Rep. of Germany .......... 7/100

*Primary Examiner*—D. S. Meislin
*Attorney, Agent, or Firm*—Keith S. Bergman

[57] ABSTRACT

A tool for removing a canister type oil filter from an engine and containing oil leaked from the filter and the engine block as the filter is removed. The tool provides a cylindrical body, defining an upwardly opening upper wrenching chamber to irrotatably fit over the lower portion of an oil filter to be removed and an oil reservoir therebelow which provides means for manual turning and for attachment of other tools to aid torquing. The inside surface of the wrenching chamber is configured to fit over and irrotatably engage the lower part of particularly configured filters and allows oil to flow toward the lower oil reservoir. A peripherally defined flexible boot extends upwardly and outwardly from the open upper end of the wrenching chamber to catch oil leakage and channel the oil into the oil reservoir.

4 Claims, 1 Drawing Sheet

OIL FILTER WRENCH WITH OIL CATCHING BOOT

BACKGROUND OF INVENTION

1. Related Applications

There are no applications related hereto heretofore filed in this or any foreign country.

2. Field of Invention

My invention relates generally to tools for removal of oil filter canisters from engines and more particularly to such tools that provide structure to collect and retain oil released when a filter is separated from an engine.

BACKGROUND AND DESCRIPTION OF PRIOR ART

With the advent of canister type disposable engine oil filters that are commonly releasably carried in a generally depending mode by threaded engagement of their upper portion in an engine structure, problems arise in removing the filters for change or other purpose, as some oil in the engine, in the filter or in both commonly will drip during the filter removal process. Responsive to this problem, various oil filter wrenches that provide structures to both engage and aid in turning an engine's oil filter and to collect and retain oil that spills when the filter is disconnected have become known. Those known devices, however, have not addressed or resolved all of the problems associated with canister removal. The instant invention provides a new and novel tool of this class that resolves formerly unresolved problems.

Prior oil filter wrenches with spill collection structures have failed to disclose satisfactory means to allow an oil collector to come close enough to a supporting engine block to catch all oil leakage after release and prior to removal of the filter. The instant invention solves this problem by providing a flexible peripherally defined boot of inverted conic configuration and with axially perpendicular accordion folds to allow positioning of the upper boot rim against or in close proximity to an engine block as the filter is being unscrewed to form a spill-tight relationship with the engine block.

Prior spill collection type oil filter tools have not satisfactorily addressed the need to provide adequate means to interconnect torque generating tools to the filter tool. The instant invention solves this problem by providing not only means to aid direct manual manipulation but also a wrench connector that allows use of most common torquing tools.

Prior oil filter tools have failed to disclose satisfactory means to allow use of the tool in tight locations where lack of space or the configuration of existing structures prevent moving the spill collection structure into appropriate proximity to the area of interconnection of filter and engine for effective use. The instant invention solves this problem by providing a flexible, resiliently deformable and collapsible boot that may be deformed to an appropriate length and configuration to efficiently fulfill its purpose. The accordion folds defined in the boot provide an additional benefit of allowing the structure to be folded to a relatively small volume for storage during periods of non-use.

The instant oil filter tool is also usable on filters having either round or particularly configured fluted configurations and on filters having somewhat differing sizes. The wrenching chamber may be configured to irrotatably accept the lower portion of a larger fluted truck filter canister or may carry a tapered insert of resilient frictional material to engage the normally smaller round cylindrical automotive filter. The insert by reason of its taper may also engage smaller configured filters to allow some variance in the size of filter it accepts.

My invention provides a new and improved oil filter wrench with oil spill collection structure that successfully addresses unresolved problems of the prior art. In so doing, however, the invention resides not in any one of the specific features individually, but rather in the synergistic combination of all of its structures which give rise to the functions necessarily flowing therefrom as specified and claimed.

SUMMARY OF INVENTION

My oil filter tool provides a generally cylindrical rigid body portion defining an upwardly opening wrenching chamber to fit over and irrotatably engage the lower portion of an oil filter to be removed. The lower end of the wrenching chamber communicates with an oil collection chamber therebeneath. The vertical periphery of the oil collection chamber provides ridges to aid manual grasping and the lowermost outer portion of the oil collection chamber carries a fixture to provide attachment means for various torquing tools. The inside surface of the wrenching chamber defines configuration to irrotatably engage the lower portion of an oil filter and allow oil to flow downwardly to the oil reservoir therebeneath. A tapered insert of resilient material may be carried in the wrenching chamber to allow frictional engagement of my tool with a circularly cylindrical oil filter. An upward flaring conical boot of flexible, resiliently deformable material defining axially perpendicular curvilinear folds extends upwardly from the open upper end of the wrenching chamber body to allow the open upper end of the boot to be moved into spill preventing proximity with the engine portion about an oil filter to be removed.

In providing such a tool, it is:

A principal object to provide an oil filter wrench that has an internally configured upper wrenching chamber to irrotatably engage the lower portion of a larger peripherally configured oil filter canister and to receive an annular, deformable, tapered insert to frictionally engage a round cylindrical oil filter canister.

A further object is to create such an oil filter wrench that has an upwardly and outwardly extending boot of a flexible resiliently deformable nature that can be moved into spill preventing proximity to variously configured spaces about the juncture of a depending oil filter canister and its interconnection with an engine structure.

It is another object to provide such an oil filter wrench that has means to aid manual turning and multiple means for connecting various torquing tools to aid turning of the oil filter.

It is a further object to provide such an oil filter wrench that has a boot with axially perpendicular, spaced accordion folds to aid extensive and compressive deformation into non-spilling relationship with engine structure around the junction of an oil filter canister therewith.

Other and further objects of my invention will appear from the following specification and accompanying drawings which form a part hereof. In carrying out the objects of my invention, however, it is to be understood that its accidental features are susceptible to change, in design and structural arrangement, with only one preferred and practical embodiment being illustrated in the accompanying drawings as required.

BRIEF DESCRIPTION OF THE DRAWINGS

In the accompanying drawings which form a part hereof and wherein similar numbers of reference refer to similar parts throughout.

DESCRIPTION OF THE PREFERRED EMBODIMENT

Figures 2, 3:
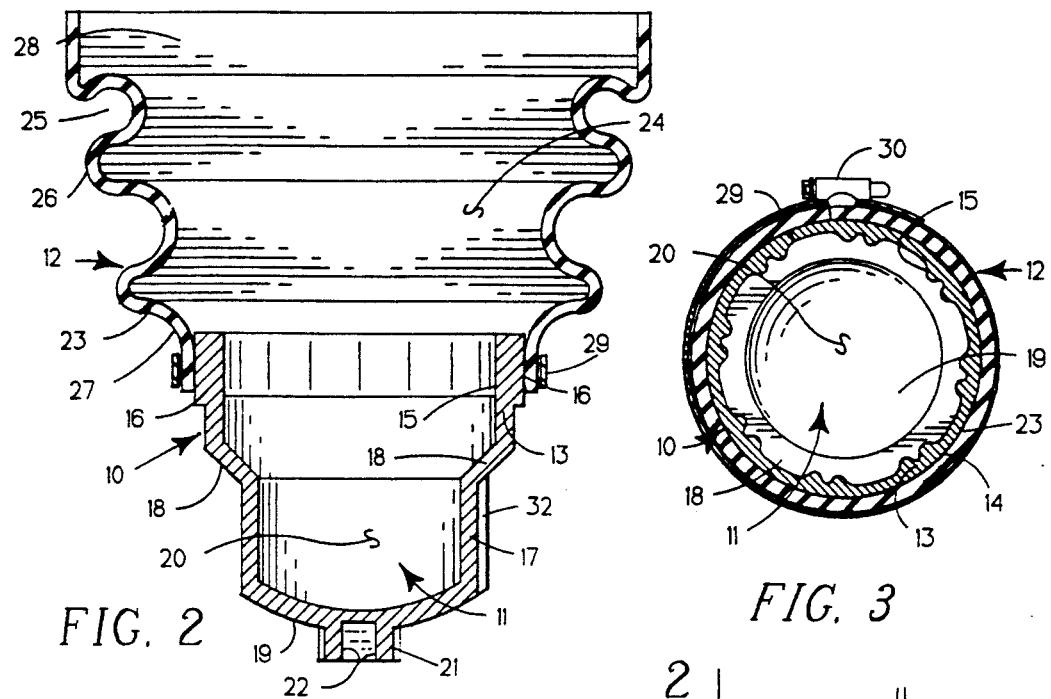
FIG. 2 is a vertical medially cross-sectional view of the wrench of FIG. 1, taken on the line 2—2 thereon in the direction indicated by the arrows.
FIG. 3 is a horizontal cross-sectional view through the interconnection of the wrenching chamber and flexible boot, taken on the line 3—3 on FIG. 1 in the direction indicated by the arrows thereon.

My oil filter wrench generally provides wrenching body 10 structurally carrying oil reservoir 11 depending therefrom and interconnecting flexible drip catching boot 12 extending upwardly and outwardly thereabove.

Wrenching body 10 provides peripherally defined cylinder 13 having vertical outer surface 14 and particularly configured inner surface 15. Tn the form of body illustrated in FIG. 2, cylinder 13 defines upper lip 16 which aids in providing thicker material in which to define configured inner surface 15. The top of upper lip 16 defines a substantially planar surface.

Inner surface 15 of the upper portion of the wrenching body is sized and configured to irrotatably fit immediately outwardly adjacent the lower surface of an oil filter canister to be serviced. The particular configuration illustrated in FIG. 3 is one that interfits about the base of a common truck type oil filter canister, but this configuration in general must be individually related to each different configuration of oil filter canister with which my wrench is to be used and such variance is within the essence, spirit and scope of my invention. The depth of inner surface 15 of the wrenching body, that is its extension in an axial direction, is not particularly critical so long as the depth is sufficient to allow interconnection with a sufficient portion of a serviced filter canister to allow removal or replacement. Preferably this depth will be approximately one inch.

Oil reservoir 11 is peripherally defined by cylindrical reservoir body wall 17 structurally interconnected to the lower portion of wrenching body 10 by transition element 18. The lower portion of cylindrical wall 17 interconnects and is enclosed by hemispherical bottom 10, to define oil chamber 20 below the upper wrenching body 10. Preferably the upwardly facing surface of transition element 18 slopes somewhat inwardly and downwardly as illustrated to aid oil flow downward into oil chamber 20.

The medial portion of the outer surface of hemispherical bottom 19 structurally carries nut 21 having a hexagonal outer cross-section to provide means for attachment of separate torquing tools to the bottom of my filter wrench. The medial portion of the nut defines channel 22 having a square cross-sectional shape to accept the traditional square headed connector of an ordinary socket wrench.

Both wrenching body 10 and oil reservoir 11 must be formed of some rigid durable material having sufficient strength to allow these elements to fulfill their purpose. The material of preference is a mild steel, though other metals and some harder, more dense resinous and polymeric plastics having appropriate physical characteristics are also within the scope of my invention.

Flexible boot 12 provides an upwardly flaring funnel-like structure having somewhat the shape of a truncated cone. The boot is formed by peripheral sheet-like element 23 defining medial oil collection channel 24. Axially spaced annular indentations 25, having annular protuberances 26 therebetween, are defined in the vertically medial portion of the peripheral element 23 to allow the structure to be expanded and contracted parallel its axis in a fashion similar to an accordion. The lower truncated portion of the flexible boot defines lower annular collar 27 to fit about the outer peripheral surface of upper lip 16. The upper portion of the boot defines a similar upper annular collar 28 having a planar upper surface substantially perpendicular to the axis of the structure to aid in collecting oil spills.

The peripheral element 23 of the flexible boot is formed of a resilient or elastically deformable material that has sufficient retentent memory to be generally configurationally sustaining, but yet fairly readily allow manual deformation. The material of preference is one of the polymeric materials having an elastomeric nature somewhat similar to rubber, but yet is impervious to and uneffected by hydrocarbons and oils. Natural rubber, though its general physical characteristics are appropriate, is not a particularly desirable material for peripheral element 23 as it deteriorates and tends to change its physical characteristics upon exposure to hydrocarbons and engine oils which the boot is to contain.

Lower circular collar 27 of the boot fits in overlapping relationship about upper lip 16 of the wrenching body and must be so positionally maintained for the tool to be effective. In the instance illustrated, hose clamp having semi-rigid annular body portion 29 and screw-type tightening mechanism 30 is carried about the exterior surface of collar 27 to fastenably maintain that collar on upper lip 16. The particular clamp illustrated is a well known variety that is commercially available, but other clamps serving the same purpose are usable with my invention and are within its scope. Other methods of fastening collar 27 on upper lip 16 such as adhesion, thermal welding of the adjacent surfaces of the elements and the like are also within the scope of my invention, so long as they maintain the two elements in interconnected, oil tight relationship.

The external peripheral surface of cylindrical wall 17 of the oil reservoir is sized for a comfortable grip of a user and preferably defines alternating grooves 31 and protuberances 32 to aid grasping and manual manipulation of the element, especially in turning motions. This grooved external surface is not necessary to my invention, but is desirable and adds convenience to the tool since the external surface of the oil reservoir may become coated with oil and it may become slick and difficult to manually manipulate.

Figures 1, 4, 5:
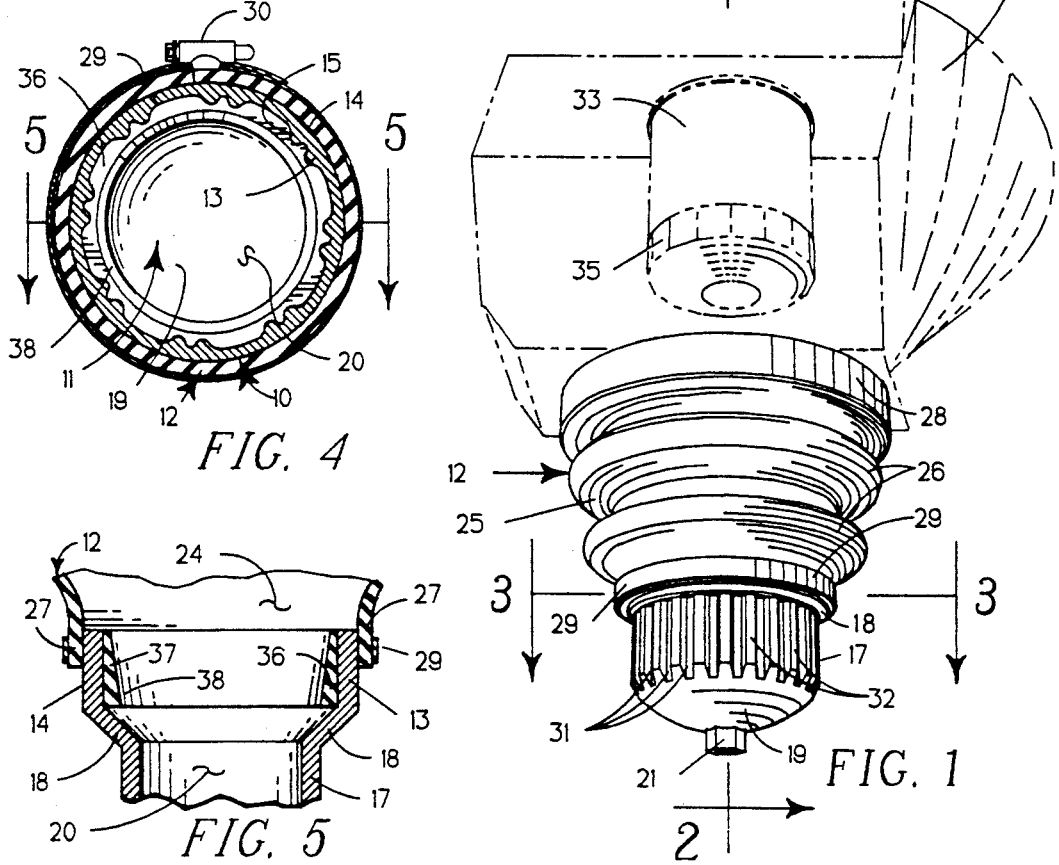
FIG. 1 is an isometric surface view of my oil filter wrench in position for placement for use immediately below an oil filter carried by an engine both partially shown in dashed outline.
FIG. 4 is a horizontal cross-sectional view showing a second species of my invention having an insert for use with round oil filters, taken from a position similar to that of FIG. 3.
FIG. 5 is a partially cut-away vertical cross-sectional view through the medial portion of the structure shown in FIG. 4, taken on the line 5—5 on that Figure in the direction indicated by the arrows thereon.

A second species of my invention having an annular insert to adapt it for use with cylindrical automotive type oil filter canister having no non-circular structure for wrench interconnection is illustrated in FIGS. 4 and 5. This structure in essence is substantially the same as that previously described for the wrenching body 10, oil reservoir 11, and flexible boot 12. The species additionally provides annular insert 36 having configured radially outer surface 37 to fit in a mating relationship immediately inwardly adjacent inner surface 15 of the wrenching body. The vertical height of the annular insert is substantially the same as that of inner surface 15 of the wrenching body so that the insert is maintained against downward motion by the transition element 18 immediately below the configured inner surface 15. The inner surface 38 of the annular insert is tapered inwardly in a downward direction so as to comprise the surface of a truncated conic. The angulation of the inner surface is fairly steep so that it defines a fairly acute angle, preferably of not more than about twenty degrees, with the axis of the annulus. The inner surface 38 is sized so that the vertically medial portion will be approximately the same diameter as the lower periphery of a circular oil filter canister to be serviced.

The annular insert 36 is formed of some resiliently, and preferably elastically, deformable material of relative high surface friction so that it may frictionally engage an oil filter canister and allow turning of that filter by reason of its frictional engagement therewith. The material of preference for this element is a synthetic polymeric elastomer similar to that from which the peripheral sheet of the flexible boot is formed with a surface 38 configured to increase friction.

Having thusly described my invention, its operation and use may be understood.

Disposable canister type oil filters have become common for use with various vehicular engines. These filters are generally carried in a depending position on a downwardly facing surface of an engine and are releasably interconnected to that engine block by threaded engagement in a hole defined therein. Over the course of their development such a filter 33 is illustrated in FIG. 1 where it is seen in operative position in engine block 34, both shown in dashed outline. Such canister filters have become reasonably standarized in their size and configuration.

Filters for use in larger vehicles such as trucks generally have a peripheral shape with a lowermost portion of the periphery defining a non-circular band 35 adapted to irrotatably interfit with a wrench to aid placement and removal. The common type of such configuration is that illustrated by the inner surface 15 of wrenching body 10 illustrated in FIG. 3. A common type of oil filter adapted particularly for use on smaller passenger type vehicles defines a cylindrical canister without any non-circular portion adapted to irrotatably interfit with a wrench. The first species of my invention is operative with a truck-type filter and when used with the insert of the second species is adaptable for use with a cylindrical automotive type filter.

To use ny oil filter wrench, the device is formed and assembled according to the foregoing specification and manually positioned below an oil filter canister 33 to be removed. The wrench is then manually moved upwardly toward the canister until the upper wrenching body 10 contacts the lower periphery of the filter canister. Tn the case of the first species of my invention, configured inner surface 15 of the wrenching body will contact the wrenching portion 35 of the filter canister and the wrench is moved upwardly as far as possible to make a secure connection. In the case of the second species, the wrench is moved upwardly until the lowermost portion of the circular periphery of the canister contacts inner surface 38 of insert 36, and the tool is maintained with some upward force against the lower portion of the canister to create and maintain appropriate frictional contact. Flexible boot 12 is then moved, with deformation if necessary, either upwardly or downwardly as required, so that its upper portion surrounds the filter canister and is close to the external surface of the engine structure carrying the canister to collect as much spillage as possible.

In this condition the oil filter wrench is rotated appropriately to unscrew the filter canister from its mounting on engine block 34, normally in a counter-clockwise direction. This rotation may be accomplished manually by grasping the outer surface of oil reservoir 11 or by using various torque generating tools applied to either the exterior surface or interior chamber of nut 21 or by a combination of both methods. As the filter is removed from the engine block, even though oil- has been previously removed from the lubrication system, a certain amount of oil will be retained both in the engine structure and in the filter. Some of this oil will tend to spill downwardly upon removal of the filter generally substantially vertically on or about the periphery of the filter. As this occurs, the oil will drip into the upper portion of flexible boot 12 and move downwardly through collection channel 24, about the oil filter and ultimately collect in chamber 20 defined by the oil reservoir. After the filter is removed from an engine, it may be manually removed from the wrenching tool and collected oil may be removed from the tool by gravity by turning it upside down over some disposal area.

It should be noted that in using my filter wrench with its annular insert upon a cylindrical oil canister, the wrench will have to be maintained with sufficient force against the bottom of the canister to create enough friction to allow rotation of the canister upon rotation of the wrench. If such force cannot be attained, my wrench may also be used in combination with an ordinary band-type oil filter wrench, applied to the canister above the upper portion of flexible boot, to at least start the canister unscrewing process and yet provide the benefits of oil spill collection.

The foregoing description of my invention is necessarily of a detailed nature so that a specific embodiment of it might be set forth as required, but it is to be understood that various modifications of detail, rearrangement and multiplication of parts might be resorted to without departing from its spirit, essence or scope.

Having thusly described my invention, what I desire to protect by Letters Patent, and what I claim is:

1. A tool for removing disposable canister type oil filters from an engine structure and capturing oil drippage released in the process, comprising in combination:

a rigid cylindrical wrenching body defining a medial channel and having
an inner surface configured to fit in irrotatable adjacency with the lower portion of an oil filter canister to be removed and
an upper lip defining a cylindrical surface for interconnection with a flexible boot;

an oil reservoir communicating with a lower portion of the wrenching body and depending therebeneath, the said oil reservoir having an oil chamber to collect oil moving downwardly from the wrenching body, means in its lower outer portion to aid the interconnection of torquing tools and alternating groove and protuberance means on its external surface to aid manual grasping; and a peripherally defined flexible boot interconnected to the upper lip of the wrenching body, said flexible boot having a medial oil spill collection channel to divert oil entering the boot downwardly to the wrenching body, annular alternately spaced grooves and protuberances allowing extension and compression in a vertical direction, a lower circular collar configured to fit immediately outwardly adjacent the upper lip of the wrenching body, and fastening means interconnecting the adjacent surfaces of the lower circular collar of the boot and the upper lip of the wrenching body.

2. The tool of claim 1 further characterized by the means fastenably interconnecting the lower collar of the flexible boot and the upper lip of the wrenching body comprising an adjustably releasable annular pipe clamp.

3. The tool of claim 1 wherein the means carried by the lower portion of the oil reservoir to aid attachment of torquing tools comprises a hexagonal nut adapted to receive peripherally contacting wrenches and defining an internal square channel adapted to receive a socket wrench.

4. The tool of claim 1 further comprising:

an annular insert having radially outer surface to conformably fit inwardly adjacent the configured inner surface of the wrenching body and a radially inwardly and downwardly tapering inner surface, said insert being formed of resiliently deformable material having a high friction inner surface to contact a the lower portion of a circularly cylindrical filter canister with sufficient friction to rotate that said canister.

* * * * *